Dec. 19, 1961     W. STANDING     3,013,428
APPARATUS FOR DETERMINING THE MELTING POINT OF A SUBSTANCE
Filed April 22, 1958     2 Sheets-Sheet 1
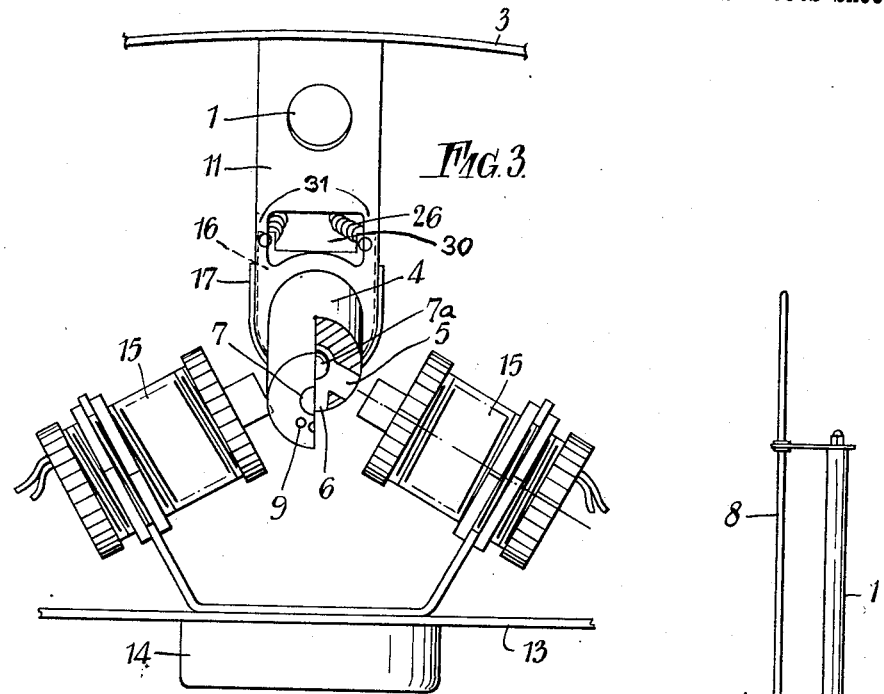
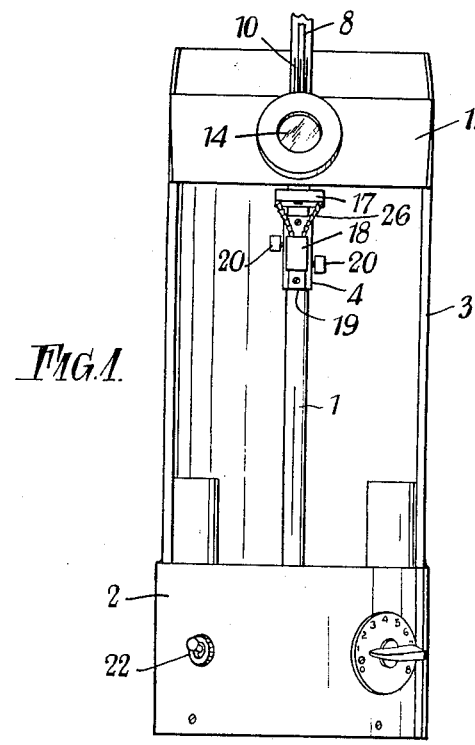
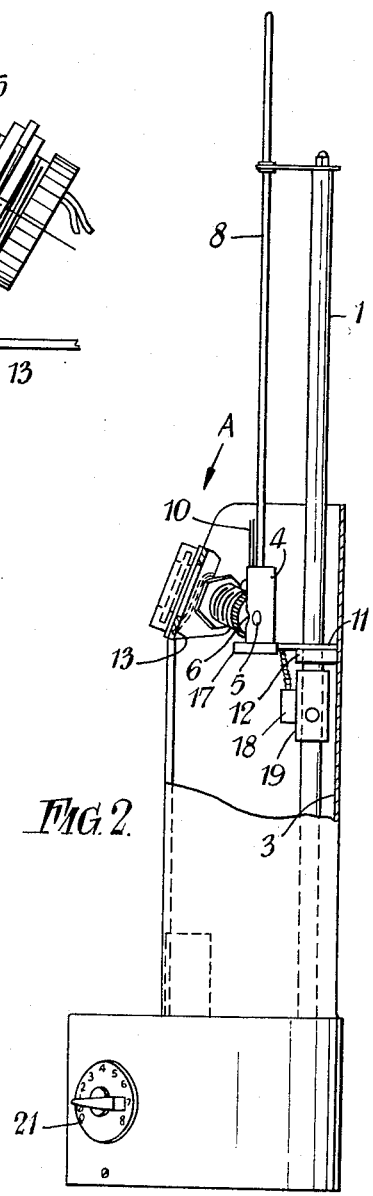

Dec. 19, 1961   W. STANDING   3,013,428
APPARATUS FOR DETERMINING THE MELTING POINT OF A SUBSTANCE
Filed April 22, 1958   2 Sheets-Sheet 2

APPARATUS FOR DETERMINING THE MELTING POINT OF A SUBSTANCE

Walter Standing, London, England, assignor to Electrothermal Engineering Limited, London, England, a British company
Filed Apr. 22, 1958, Ser. No. 730,234
Claims priority, application Great Britain Apr. 24, 1957
2 Claims. (Cl. 73—17)

This invention relates to an apparatus for determining the melting point of a substance contained in a tube of small bore.

One method of determining the melting point of a substance involves introducing some of the substance into a capillary tube which, when the measurement is effected, is open at one end. The tube is suspended in a vertical position and heated, a thermometer being employed to determine the temperature at which a thin layer of the material, at the bottom of the tube, melts. The apparatus to be described has been developed for carrying out the method indicated above.

According to the invention there is provided an apparatus for determining the melting point of a substance, comprising a block of heat-conducting material, a substantially flat face on the block, a first inner wall portion of the block defining a chamber within the block, a second inner wall portion defining a straight passageway leading from the chamber to the external surface of the block and of sufficient cross-sectional dimensions to accommodate a capillary-tube containing said substance, a third inner wall portion defining a hole in the block through which the interior of the chamber can be viewed, a fourth inner wall portion defining a cavity for receiving a temperature-measuring device for indicating the temperature in the chamber, an insulated electrical heating element of substantially flat shape and securing means holding the element effectively in contact with said face.

Figure 4:
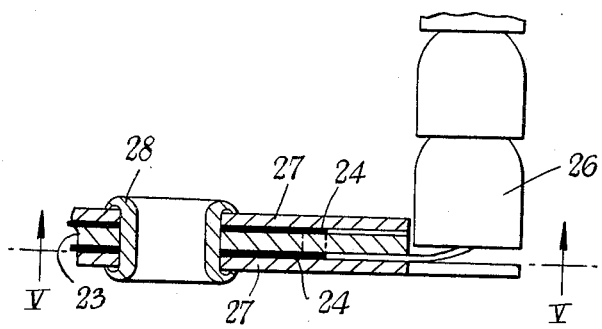
Figure 5:
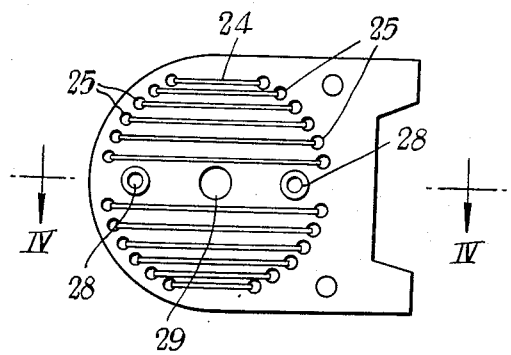

For a better understanding of the invention and to show how the same may be carried into effect, reference will now be made to the accompanying drawings in which:

FIGURE 1 is a view in front elevation of an apparatus for determining the melting point of a substance or of different substances contained in three capillary tubes, FIGURE 2 shows an end elevation of the same apparatus, part being removed for ease of illustration, FIGURE 3 is a further view, partly in section, of part of the apparatus, as seen in the direction of the arrow A in FIGURE 2, FIGURE 4 is a sectional view (not to scale) of part of an electrical heating element, the section being taken along the line IV—IV of FIGURE 5, and FIGURE 5 is an underneath plan view of the element as seen on the line V—V of FIGURE 4.

In the apparatus illustrated, a metallic support tube 1 projects vertically upward from a control base 2. A curved shield 3 also projects upwardly from the control base 2 and this shield embraces a brass cylinder or block 4 supported by the tube 1 and employed as a heating block for the reception of a thermometer and three capillary tubes containing the material of which the melting point is to be determined. The cylinder or block 4 is formed with two passages 5 and a viewing port 6 midway between them, all being at the same vertical height in the cylinder. These passages and the port extend from the outer surface of the cylinder towards the cylinder axis, but they are inclined at 20° to the horizontal in such manner that they extend downwardly into the cylinder. An angle of 60° is subtended at the cylinder axis by the axes of the two holes 5. The passages 5 and the port 6 extend sufficiently far into the block which is formed with inner walls including a transverse wall serving to define a chamber formed with a floor 7a so that the passages 5 and the port 6 communicate with the chamber. The cross-sectional shape of the block 4 at this level and the chamber are shown in FIGURE 3. An axial passage 7 extends above the floor and receives the lower end of a mercury thermometer 8. The floor 7a of the chamber is a short distance below the passages 5 and the port 6. Three further openings 9 of smaller diameter are also formed in the block 4 and they extend from the upper face of the cylinder in a direction substantially parallel to the axis of the cylinder until they merge into the chamber. As can be seen from FIGURE 3, the chamber is slightly enlarged at one side below the openings. Three capillary tubes 10 are inserted in the openings 9, these tubes being open at the upper end and containing material of which the melting point is to be determined. Thus the capillary tubes may contain three samples all of the same substance or they may contain different substances.

The lower end of the block 4 is secured to one end of a flat platform 11 which is mounted at the other end, by means of screws (not shown), on the upper face of a support member 12 attached to the shield 3. The shield 3 is formed with a cross-piece 13 which is provided with a magnifying window 14 through which the lower ends of the capillary tubes can be seen located in the chamber. Also mounted on the cross-piece 13 are two lamps 15 which direct rays of light into the passages 5 in the cylinder in order to illuminate the lower ends of the capillary tubes. The side edges of the shield 3 are bent inwardly in order to afford channels which accommodate conductors leading from the control base 2 to the lamps 15.

A flat D-shaped electric heating element is pressed against the lower face of the platform 11, being secured thereto with the aid of a support member 17 which comprises a D-shaped flat portion having side walls upwardly turned from the curved part of the D. These side walls surround the heater element and conceal it in the views depicted by FIGURES 1 and 2. A screw is passed through the centre of the flat portion of the support member 17, through the heater element 16 and into internally threaded holes in the platform 11 and in the base of the cylinder 4. Thus the heater element is pressed into contact with the lower face of the platform 11 so that the heat generated in the element is conducted via the platform to the base of the cylinder 4. It will be appreciated that the element is effectively in contact with the cylinder 4 itself.

The heater element itself is illustrated in FIGURES 4 and 5. It consists of a mica former 23 upon which is a winding of strip-like resistance metal 24, for example of nickel-chrome, the strip passing from one face of the former to the other through holes 25 near the edge of the former. A pair of wires is secured to each end of the winding and the wires of each pair are threaded through a respective string of ceramic insulating beads 26. The former annd winding are sandwiched between further layers of mica, as shown at 27. Two eyelets 28 hold the element together and a hole 29 through the mica permits passage therethrough of the screw which secures the element to the platform 11.

The wires surrounded by the beads 26 extend from the heater element to a plug 18 which is inserted in a socket member 19 and can be secured therein by tightening two screws 20. Conductors leading to the socket member 19 from a transformer in the control base 2 pass through the tube 1. The transformation ratio of the transformer is controlled by a multi-position switch 21. An on-off switch 22 is also provided and there may also be an indicating light which glows when current is passing through the heater. By suitably adjusting the switch 21, the current passed through the heater element can be controlled. Thus the rate of heating the cylinder 4 can be controlled so that the temperature of the material in the capillary tube can be brought to the required initial value and then passed at a suitable rate through the range in which the melting point lies.

When the apparatus is in use, a sleeve made of Pyrex (registered trademark) will normally be fitted over the cylinder 4 in order to limit the circulation of air currents through the holes 5 and 6. The Pyrex sleeve should be of the smallest diameter possible having regard to the danger of the sleeve cracking when the cylinder 4 expands therein and the lower end of the sleeve should be machined flat so that when it is stood on the machined platform 11 there is little possibility of air entering under it. In order further to limit air currents, the thermometer is preferably formed with a shoulder slightly above the location where the mercury bulb joins the stem, this shoulder fitting snugly in the passage 7 of the heating cylinder. If there is sufficient space between the thermometer stem, above the shoulder, and the wall of the hole 7, this may be packed with rolled asbestos paper strip. It is desirable to insert capillary tubes in all three openings 9, even when only one sample is to be examined, to prevent air passing through these openings.

It will be seen from FIGURE 3 that the platform 11 is apertured at 30 so that the only path for heat to be conducted from the cylinder 4 to the remainder of the apparatus is along the two narrow arms 31 on either side of the aperture 30. Thus the heat-conduction losses are low so that the temperature of the block 4 can be controlled fairly easily.

I claim:
1. Apparatus for determining the melting point of a sample and which responds quickly to increase in temperature, including a temperature responsive element, capillary sample retaining means, illuminating means to illuminate the sample, a block of heat conducting material having a cylindrical surface and a substantially flat face at one extremity thereof, a removable cylindrical sleeve surrounding said block with little clearance and a heater in heat transmitting relation to said flat face of said block; said block being formed with: inner walls including a transverse wall serving to define a chamber formed with a floor, an axially aligned passage directed through the block above said floor to establish communication with said chamber to receive said temperature responsive element with the lower end thereof accommodated in said chamber, a port obliquely directed through a portion of the block from the cylindrical surface thereof to establish communication with said chamber above said floor and to allow view into said chamber, at least one passage convergent towards said oblique passage and directed through a portion of the block from the cylindrical surface thereof to establish communication with said chamber above said floor with the longitudinal axes of said port and said convergent passage subtending an acute angle, at least one opening having its longitudinal axis substantially parallel with the longitudinal axis of the block and extending through said block to establish communication with said chamber and to receive said capillary sample retaining means with a portion thereof accommodated in said chamber and so that said temperature responsive means and said sample are uniformly warmed, said illuminating means facing said convergent passage to illuminate the sample.

2. Apparatus for determining the melting point of a sample and which is quickly responsive to temperature changes, including a temperature responsive element, capillary sample retaining means, illuminating means to illuminate the sample, a block of heat conducting material having a cylindrical surface and a substantially flat face at one extremity thereof, a removable cylindrical sleeve surrounding said block with little clearance and a heater in heat transmitting relation to said flat face of said block; said block being formed with: inner walls including a transverse wall serving to define a chamber formed with a floor, an axially aligned passage directed through the block above said floor to establish communication with said chamber and to receive said temperature responsive element with the lower end thereof accommodated in said chamber, the cross-sectional area of said chamber being greater than the cross-sectional area of said passage, a port directed through the block from the cylindrical surface thereof to establish communication with said chamber above said floor and to allow view into said chamber, a plurality of convergent passages directed through the block from the cylindrical surface thereof to establish communication with said chamber above said floor and disposed symetrically with respect to said port with their longitudinal axes subtending an acute angle bisected by said port, at least one opening having its longitudinal axis substantially parallel with the longitudinal axis of the block and extending through said block to establish communication with said chamber and to receive said capillary sample retaining means with a portion thereof accommodated in said chamber and so that said temperature responsive element and the sample are substantially uniformly warmed, said illuminating means facing said convergent passages to illuminate said sample.

References Cited in the file of this patent
UNITED STATES PATENTS

| | | |
|---|---|---|
| 2,036,432 | Musante | Apr. 7, 1936 |
| 2,658,382 | Vanderkamp | Nov. 10, 1953 |
| 2,669,863 | Shapiro | Feb. 23, 1954 |

FOREIGN PATENTS

| | | |
|---|---|---|
| 289,095 | Switzerland | Feb. 28, 1953 |
| 933,788 | Germany | Oct. 6, 1955 |

OTHER REFERENCES

Article: Journal of Scientific Instrument (British), vol. 26, February 1949, page 47, "Reflected Light Melting Point Apparatus."